US006999217B2

(12) United States Patent
Chang

(10) Patent No.: US 6,999,217 B2
(45) Date of Patent: Feb. 14, 2006

(54) IMAGING SYSTEM SWITCHING DEVICE

(75) Inventor: Sean Chang, Taoyuan (TW)

(73) Assignee: Delta Electronics, Inc., (TW)

( * ) Notice: Subject to any disclaimer, the term of this patent is extended or adjusted under 35 U.S.C. 154(b) by 140 days.

(21) Appl. No.: 10/721,273

(22) Filed: Nov. 26, 2003

(65) Prior Publication Data
US 2004/0190100 A1  Sep. 30, 2004

(30) Foreign Application Priority Data
Mar. 31, 2003 (TW) .............................. 92107310 A

(51) Int. Cl.
G02B 26/08 (2006.01)
(52) U.S. Cl. ...................................... 359/212; 359/223
(58) Field of Classification Search ................ 359/223, 359/196, 212, 225; 250/208.1; 399/394
See application file for complete search history.

(56) References Cited

U.S. PATENT DOCUMENTS 6,452,147 B1 *  9/2002  Inada ....................... 250/208.1
6,539,199 B1 *  3/2003  Miyata et al. .............. 399/394

* cited by examiner

Primary Examiner—Euncha P. Cherry
(74) Attorney, Agent, or Firm—Rabin & Berdo, P.C.

(57) ABSTRACT

An imaging system switching device is described. The imaging system switching device is used for multi-function office machines, which has a scanner and a printer and additionally a copy machine and a fax machine. The imaging system switching device has a roller, a lens, a reflector, an optical receiver, an optical transmitter, and an optical switch. The optical switch changes light streams transmitting route for different function so as to use the same transmitting elements for a scan function and a print function. Another aspect of the imaging system switching device further has an original roller so that the switching device of the imaging system can simultaneously scan and print.

20 Claims, 2 Drawing Sheets

IMAGING SYSTEM SWITCHING DEVICE

FIELD OF THE INVENTION

The present invention relates to a switching device, and especially, to an optical switching device for an image system.

BACKGROUND OF THE INVENTION

Due to the rapid progress of the optical and semiconductor technology, office machines, such as fax machines, copy machines, scanners, and printers, not only be reduced in size but also be increased in accuracy.

A laser printer is popular for printing original documents. A working theory of the laser printer is to uniformly spread electrostatic charge on a photo conductor drum and then expose the photo conductor drum to light streams to form a electrostatic latent image thereon. Subsequently, toners are attached on the photo conductor drum by way of an electric field action to reproduce a toner image and then the toner image is transferred to a paper.

A scanner is utilized to read documents, including texts and/or pictures. The scanner utilizes a light source to expose the documents under light streams and through a lens to accumulate reflected light streams on a charge coupled device (CCD) or contact image sensor (CIS) for transferring optical signals into electrical signals. The electrical signals are then transferred into digital signals with an analog/digital converter and finally these digital image data are stored to complete the scanning procedure.

A fax machine reads an image, such as texts and/or pictures, and sends the same to a remote fax machine to reproduce the image there. In addition, a copy machine reads an image and reproduces the image therein immediately. Because the above office machines include some overlapping functions, a multi-function office machine is designed to combine the above functions of the office machines into one machine. A popular multi-function office machine includes functions of a printer, a scanner, a copy machine, and fax machine.

For a current multi-function office machine, a flatbed scanner or a sheetfed scanner is normally utilized to read the image and a printer is utilized to output the image. Therefore, the multi-function office machine includes scanning and printing functions, and may further include copy and fax functions. The multi-function office machine combines multiple conventional office machines into one machine so as to reduce space requirements in an office. However, a conventional multi-function office machine still occupies a quite large area of an office desk.

SUMMARY OF THE INVENTION

One object of the present invention is to provide a switching device for an imaging system to integrate efficiently together optical transmitting devices of a multi-function office machine.

Another object of the present invention is to provide a switching device for an imaging system to reduce efficiently the size of a multi-function office machine.

Yet another object of the present invention is to provide a switching device for an imaging system to reduce efficiently the total cost of a multi-function office machine.

To achieve these and other advantages and in accordance with the object of the invention, the present invention provides an imaging system switching device utilized in a multi-function office machine. The imaging system switching device provides scan, print, copy, and fax functions. The imaging system switching device has a roller, a reflector, lens, an optical receiver, an optical transmitter, and an optical switch. The reflector swings in a predetermined angle and cooperates with the roller rotation to scan and/or print contents of a document. The optical receiver receives optical scanning signals and transfers the same to digital signals while the imaging system switching device is scanning an input document. The optical transmitter generates optical output signals while the imaging system switching device is printing an output document. The optical switch is capable of switching optical signal transmitting paths.

When the imaging system switching device is scanning the input document, the roller rotates the input document and cooperates with the reflector to scan the whole input document. The optical receiver receives optical scanning signals and then transforms the same into digital signals for storage. In addition, an optical switch is disposed between the reflector and the optical receiver to receive light streams generated by an optical transmitter to light up the input document. The light stream path between the optical switch and the roller is the same for the light streams generated by the optical transmitter and the light streams received by the optical receiver so that the lighting position and the scanning position are the same position. Hence, the lighting efficiency thereof is increased. The optical transmitter is a semiconductor light source, such as a light emitting diode or a laser diode.

When the imaging system switching device prints an output document, the optical transmitter generates optical output signals to the optical switch, and the optical switch transmits the optical output signals to the reflector by way of the lens. The reflector swings and cooperates with the rotation of the roller to form an electrostatic latent image thereon, and the electrostatic latent image with toner is then transferred onto an output medium.

When the imaging system switching device executes a copy procedure, the imaging system switching device scans the input document and then prints the input document. When the imaging system switching device executes a fax procedure, the imaging system switching device scans the input document and utilizes a telephone device to transmit the input document to a remote fax machine.

The optical transmitter is a light emitting diode (LED) or a laser diode. The optical receiver comprises a photo diode. The optical switch is a mechanical optical switch, a Micro Electro Mechanical System (MEMS) optical switch or a beam splitter.

Another aspect of the present invention is to provide an imaging system switching device in which an additional roller is provided and the optical switch is the preferred optical path routing device. Therefore, the imaging system switching device according to the present invention can simultaneously execute scanning and print functions to enhance the speed of the copy function. The optical path routing device can simultaneously transmit the optical output signals and the optical scanning signals without interference. The optical path routing device is a beam splitter, a total internal reflection (TIR) prism, or an optical router.

Therefore, the imaging system switching device according to the present invention efficiently reduces the volume of the multi-function office machine and therefore the occupation area of the office desk is also reduced. The manufacture cost is also reduced because the optical transmission components for scanning and printing are the same.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is the best presently contemplated mode of carrying out the present invention. This description is not to be taken in a limiting sense but is made merely for the purpose of describing the general principles of the invention. The scope of the invention should be determined by referencing the appended claims.

Figure 1A:
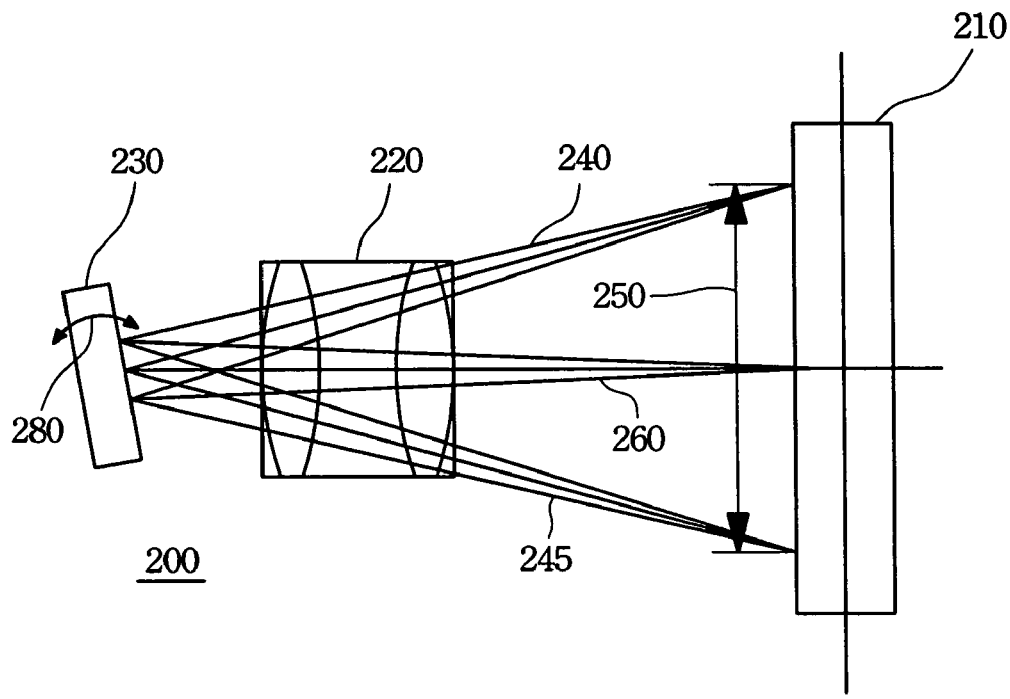
FIG. 1A is a schematic top view of a first preferred embodiment of the imaging system switching device according to the present invention.
Figure 1B:
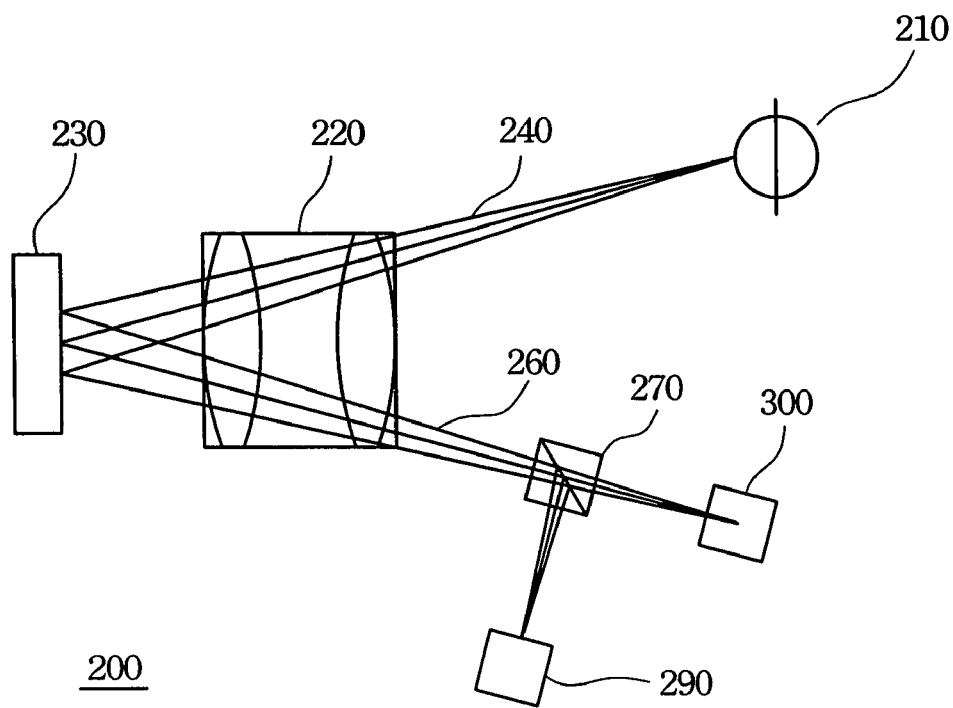
FIG. 1B is a schematic side view of the first preferred embodiment of FIG. 1A.

Referred to FIG. 1A and FIG. 1B, FIG. 1A is a schematic top view of a first preferred embodiment of the imaging system switching device according to the present invention, and FIG. 1B is a schematic side view thereof. The imaging system switching device 200 includes a roller 210, lens 220, a reflector 230, an optical switch 270, an optical transmitter 290, and an optical receiver 300. The switching device 200 combines the optical transmitting system and the optical receiving system together so that a main optical transmission path of a scanner and a main optical transmission path of a printer machine are combined into a same structure. Therefore, a size of the multi-function office machine is reduced so as to be more suitable for use on an office desk.

In a scanning procedure, the switching device 200 scans a document on the roller 210 to receive optical signals from a path of light streams 240 to a path of light stream 245, that is, a scanning range 250; meanwhile, the roller 210 provides another direction of movement, rotation, of the document. Therefore, the switching device 200 utilizes a reflector 230 to scan among a swing angle 280 for constructing a scanning range 250 and cooperates with the roller 210 completely to scan the whole page of the document.

Meanwhile, the optical signals scanned from the path of light streams 240 to the path of light streams 245 are transmitted to the reflector 230 by way of the lens 220, and the same are reflected to the optical switch 270 by way of the lens 220 through a path of light streams 260. Subsequently, the optical switch 270 switches the optical signals to the optical receiver 300. The optical receiver 300 then transforms the optical signals into digital data for storage.

Normally, in a scanning procedure, a conventional scanner utilizes a fluorescent tube to light up the document. The imaging system switching device 200 according to the present invention can utilize the optical transmitter 290 to light up the document for scanning. Because the optical receiver 300 and the optical transmitter 290 utilizes a same transmission path to transmit respective light streams between the optical switch 270 and the document disposed on the roller 210, the optical transmitter 290 lights up a position where the optical receiver 300 is scanning so that the lighting efficiency and accuracy are efficiently enhanced. The optical transmitter 290 may use any point light source to light up the document, for example a light emitting diode (LED) or a laser diode.

In a printing procedure, the switching device 200 utilizes the optical transmitter 290 to transmit optical signals to the optical switch 270. The optical switch 270 can switch the transmission path according to a predetermined work requirement of the switching device 200. These optical signals construct the light streams 260 and transmit to the reflector 230 by way of the lens 220. The reflector 230 then swings in the swing angle 280 to reflect the light streams 260 to the roller 210 by way of the lens 220. Moreover, the swing angle 280 of the reflector 230 can reflect the optical signals between the paths of light streams 240 and light streams 245. The roller 210 further provides another direction of movement, rotation, to form an electrostatic latent image thereon by the optical signals transmitted by the optical transmitter 290. Subsequently, the electrostatic latent image on the roller 210 is toners attached by way of an electric field action to reproduce a toner image thereon. Finally, the toner image is transferred from the roller 210 onto a medium, such as paper.

In this preferred embodiment, the roller 210 is preferably a photo conductive drum to achieve both a document printing function and a document feeding function. The present invention combines the optical components of a scanner and the optical components of a printer together so that the size of the multi-function office machine can be efficiently reduced. Accordingly, the occupation area on an office desk is also efficiently reduced. Further, the same lens or a different lens can be selected as the lens 220 for receiving and transmitting optical signals. In addition, the optical switch 270 is utilized to switch the optical signals to different output devices according to the predetermined purpose thereof. Therefore, the optical switch 270 can be a mechanical optical switch, that is, a step motor to move an optical fiber, a mirror, a prism, or any other element to change the light stream path. A Micro Electro Mechanical System (MEMS) optical switch can also be selected for the optical switch 270, which utilizes a silicon semiconductor to form a micro electro mechanical structure. The optical switch 270 can further use a beam splitter or a total internal reflection (TIR) prism to separate the receiving optical signals and the transmitting optical signals.

Figure 2A:
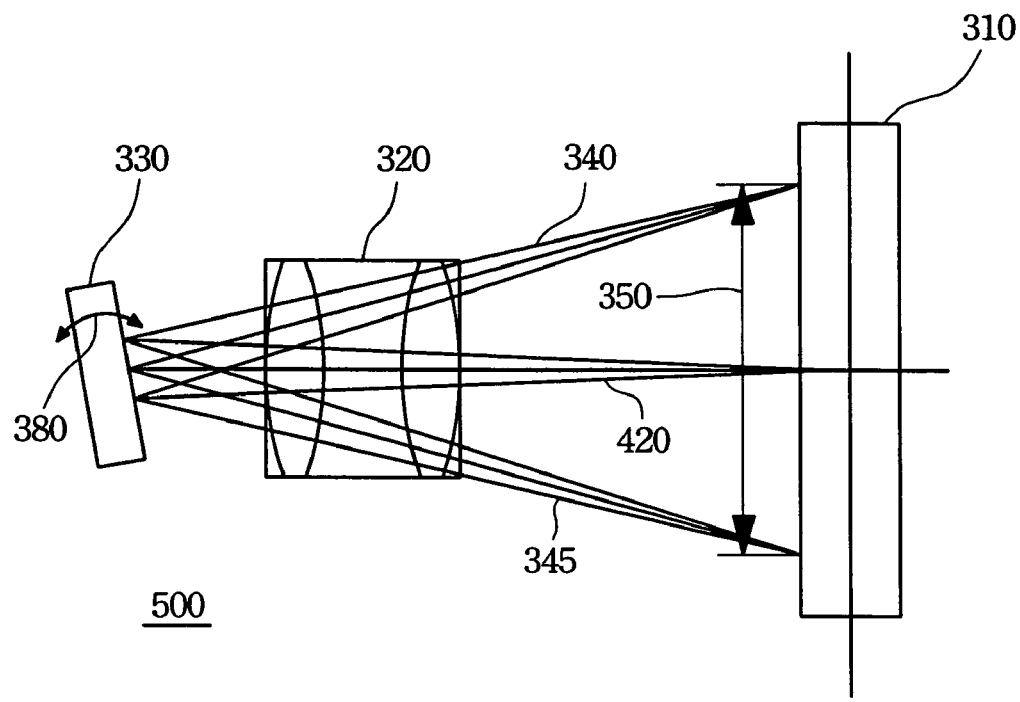
FIG. 2A is a schematic top view of a second preferred embodiment of the imaging system switching device according to the present invention.
Figure 2B:
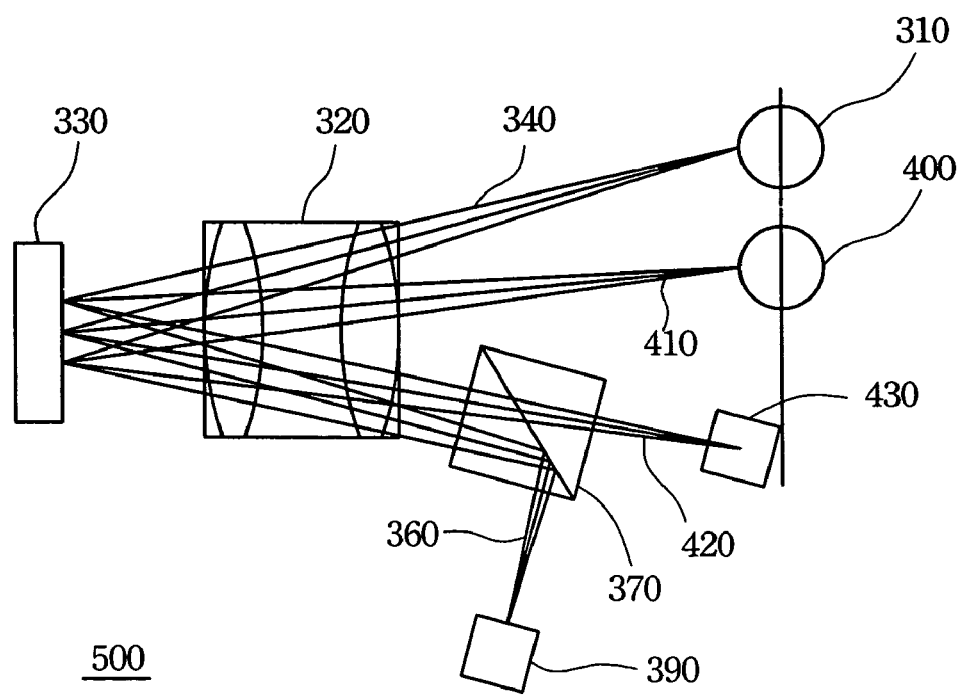
FIG. 2B is a schematic side view of the second preferred embodiment of FIG. 2A.

Referring to FIG. 2A and FIG. 2B, FIG. 2A is a schematic top view of a second preferred embodiment of the imaging system switching device according to the present invention, and FIG. 2B is a schematic side view thereof. The imaging system switching device 500 includes two rollers 310 and 400, lens 320, a reflector 330, an optical path routing device 370, an optical transmitter 390, and an optical receiver 430. The roller 310 is a photo conductive drum and the roller 400 is a roller for feeding papers.

The switching device 500 of the second preferred embodiment can further achieve scanning and printing functions simultaneously. As a document is being scanned on the roller 400, optical signals construct light streams 410 and transmit to the reflector 330 by way of the lens 320. The reflector 330 swings between a swing angle 380 to execute a scanning procedure. In additional, the roller 400 provides another direction of movement, rotation, so as to scan texts and/or pictures on the whole document.

The light streams 410 therefore are reflected by the reflector 330 and transmitted to the optical path routing device 370 by way of the lens 320. Accordingly, the optical signals are furthermore transmitted to the optical receiver 430 along the path of light streams 420, and therefore the digital data of the scanned image are generated and stored.

Furthermore, when the image printing function and the scanning function are executed simultaneously, the optical transmitter 390 generates optical signals to construct light stream 360. The light streams 360 are transmitted to the optical path routing device 370 and then to lens 320 via a predetermined path. Subsequently, the light streams 360 are transmitted to the roller 310, a photo conductive drum, along the path of light streams 340 by way of the lens 320. The optical signals generated by the optical transmitter 390 are transformed into an electrostatic latent image on the roller 310 while the reflector 330 swings between the path of light streams 340 and the path of light streams 345 with the swing angle 380 to form a scanning range 350 and combine with the rotation of the roller 310. Subsequently, toners are attached to the electrostatic latent image on the roller 310 by way of electric field action to reproduce a toner image thereon. Finally, the toner image is transferred from the roller 310 to paper.

In the second preferred embodiment, the roller for scanning images and the roller for printing images are different. The other optical transmission components are combined together. Therefore, the switching device 500 can simultaneously scan and print an image. The transmission signals and reception signals can simultaneously exist in the same optical transmission components by way of different transmitting paths. Therefore, a multi-function office machine with the imaging system switching device according to the present invention can scan and print at the same time.

Furthermore, the same or different lenses can be chosen as the lens 320 for receiving and transmitting optical signals. In addition, the optical path routing device 370 separates the light streams from different sources and transmits them to the respective objective components. Therefore, the optical path routing device 370 can be a beam splitter, a total internal reflection prism, or an optical router to separate the received optical signals and the transmitted optical signals into respective transmission paths without interference. A copy function combines the scanning function and the printing function. Therefore, a multi-function office with the second preferred embodiment according to the present invention has an efficiently enhanced copy speed. In additional, when the switching device according to the present invention is integrated with a telephone device, the scanned image can be immediately transmitted to a remote fax machine.

The switching device 500 can further combine the optical transmitter 290 and the optical receiver 300 according to the first preferred embodiment of FIGS. 1A and 1B to light up a same position with the same transmission path by way of the optical switch 270 for lighting and scanning the document to enhance the lighting efficiency and accuracy. As is understood by a person skilled in the art, the foregoing preferred embodiments of the present invention are illustrative of the present invention rather than limiting of the present invention.

It is intended that various modifications and similar arrangements be included within the spirit and scope of the appended claims, the scope of which should be accorded the broadest interpretation so as to encompass all such modifications and similar structures.

What is claimed is:

1. An imaging system switching device comprising:
   a first roller;
   a reflector swinging within a predetermined angular range;
   a lens disposed between the first roller and the reflector;
   an optical receiver receiving optical scanning signals and transforming the optical scanning signals into digital signals while the imaging system switching device is scanning an input document;
   an optical transmitter generating optical output signals while the imaging system switching device is printing an output document; and
   an optical switch capable of switching optical signal transmitting paths;
   wherein while the imaging system switching device is scanning the input document, the first roller rotates the input document and cooperates with the reflector swinging in the predetermined angular range to scan the whole input document and generate the optical scanning signals, the optical scanning signals are transmitted to the reflector by way of the lens, the reflector reflects the optical scanning signals to the optical switch by way of the lens, the optical switch transmits the optical scanning signals to the optical receiver, and the optical receiver transfers the optical scanning signals to the digital signals; and
   while the imaging system switching device is printing the output document, the optical transmitter generates the optical output signals to the optical switch, the optical switch transmits the optical output signals to the reflector by way of the lens, the reflector swings in the predetermined angular range and cooperate with a rotation of the first roller so that the optical output signals are transmitted to the first roller by way of the lens to form an electrostatic latent image thereon, and the electrostatic latent image with toner is transferred to an output medium.

2. The imaging system switching device of claim 1, wherein the imaging system switching device scans the input document and prints the input document so as to execute a copy procedure.

3. The imaging system switching device of claim 1, wherein the imaging system switching device scans the input document and utilizes a telephone device to transmit the input document to a remote fax machine so as to execute a fax procedure.

4. The imaging system switching device of claim 1, wherein the optical transmitter is a light emitting diode (LED) or a laser diode.

5. The imaging system switching device of claim 1, wherein the optical receiver comprises a photo diode.

6. The imaging system switching device of claim 1, wherein the optical switch is a mechanical optical switch, a Micro Electro Mechanical System (MEMS) optical switch, a beam splitter, a total internal reflection (TIR) prism, or an optical router.

7. The imaging system switching device of claim 1, wherein the imaging system switching device further comprises an original roller and the optical switch is an optical path routing device, wherein the optical path routing device simultaneously transmits the optical output signals to the first roller and the optical scanning signals to the optical receiver to form the electrostatic latent image and the digital signals, respectively, so that the imaging system switching device scans the input document and prints the output document simultaneously.

8. The imaging system switching device of claim 7, wherein the optical path routing device is a beam splitter, a total internal reflection (TIR) prism, or an optical router.

9. The imaging system switching device of claim 1, wherein the optical transmitter generates light streams to light up the input document by way of the optical switch, the lens, and the reflector, simultaneous with the optical receiver receiving the optical scanning signals formed by the light streams and transferring the optical scanning signals to the digital signals while the imaging system switching device is scanning the input document.

10. An imaging system switching device with dual roller be utilized in a multi-function office machine, the multi-function office machine providing a printing function, a scanning function, and a copy function, the image system switching device comprising:

a first roller;

a second roller;

a reflector swinging within a predetermined angular range;

a lens disposed among the first roller, the second roller, and the reflector;

an optical receiver receiving optical scanning signals and transforming the optical scanning signals into digital signals while the imaging system switching device is scanning an input document;

an optical transmitter generating optical output signals while the imaging system switching device is printing an output document; and an optical path routing device transmitting the optical output signals to the first roller and the optical scanning signals to the optical receiver;

wherein while the imaging system switching device is scanning the input document, the second roller rotates the input document and cooperates with the reflector swinging in the predetermined angular range to scan the whole input document and generate the optical scanning signals, the optical scanning signals are transmitted to the reflector by way of the lens, the reflector reflects the optical scanning signals to the optical path routing device by way of the lens, the optical path routing device transmits the optical scanning signals to the optical receiver, and the optical receiver transfers the optical scanning signals to the digital signals; and while the imaging system switching device is printing the output document, the optical transmitter generates the optical output signals to the optical path routing device, the optical path routing device transmits the optical output signals to the reflector by way of the lens, the reflector swings in the predetermined angular range and cooperates with a rotation of the first roller so that the optical output signals are transmitted to the first roller by way of the lens to form an electrostatic latent image thereon, and the electrostatic latent image with toner is transferred to an output medium.

11. The imaging system switching device of claim 10, wherein the imaging system switching device scans the input document with the second roller and prints the input document with the first roller so as to execute a copy procedure.

12. The imaging system switching device of claim 10, wherein the optical transmitter is a light emitting diode (LED) or a laser diode.

13. The imaging system switching device of claim 10, wherein the optical receiver comprises a photo diode.

14. The imaging system switching device of claim 10, wherein the optical path routing device is a beam splitter, a total internal reflection (TIR) prism, or an optical router.

15. The imaging system switching device of claim 10, wherein the imaging system switching device scans the input document and utilizes a telephone device to transmit the input document to a remote fax machine so as to execute a fax procedure.

16. The imaging system switching device of claim 10, wherein the first roller is a photo conductive drum.

17. An imaging system switching device comprising:

a first roller;

a reflector swinging within a predetermined angular range;

lens disposed between the first roller and the reflector;

an optical receiver receiving optical scanning signals and transformed into digital signals while the imaging system switching device is scanning an input document;

an optical transmitter generating lighting streams; and an optical switch transmitting the lighting streams to the first roller and the optical scanning signals to the optical receiver;

wherein the first roller rotates the input document and cooperates with the reflector swinging in the predetermined angular range to scan the whole input document and generate the optical scanning signals, the optical scanning signals are transmitted to the reflector by way of the lens, the reflector reflects the optical scanning signals to the optical switch by way of the lens, the optical switch transmits the optical scanning signals to the optical receiver, and the optical receiver transfers the optical scanning signals to the digital signals while the imaging system switching device is scanning the input document, and the lighting streams generated by the optical transmitter utilize a reverse transmission path from the optical switch to the first roller to light up the input document for scanning.

18. The imaging system switching device of claim 17, wherein the optical transmitter is a light emitting diode (LED) or a laser diode.

19. The imaging system switching device of claim 17, wherein the optical receiver comprises a photo diode.

20. The imaging system switching device of claim 17, wherein the optical switch comprises a beam splitter.

* * * * *